United States Patent
Flordal et al.

(10) Patent No.: US 10,580,113 B2
(45) Date of Patent: Mar. 3, 2020

(54) LOADING DATA INTO A TILE BUFFER IN GRAPHICS PROCESSING SYSTEMS

(71) Applicant: Arm Limited, Cambridge (GB)

(72) Inventors: Lars Oskar Flordal, Uppsala (SE);
Toni Viki Brkic, Staffanstorp (SE);
Christian Vik Grovdal, Trondheim (NO); Andreas Due Engh-Halstvedt, Trondheim (NO); Frode Heggelund, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/153,315

(22) Filed: Oct. 5, 2018

(65) Prior Publication Data

US 2019/0108610 A1    Apr. 11, 2019

(30) Foreign Application Priority Data

Oct. 6, 2017 (GB) .................................. 1716366.8

(51) Int. Cl.
| | |
|---|---|
| *G06T 1/60* | (2006.01) |
| *G06T 1/20* | (2006.01) |
| *G06T 11/40* | (2006.01) |
| *G06T 11/00* | (2006.01) |
| *G06T 15/40* | (2011.01) |
| *G06T 15/00* | (2011.01) |

(52) U.S. Cl.
CPC ................. *G06T 1/60* (2013.01); *G06T 1/20* (2013.01); *G06T 11/001* (2013.01); *G06T 11/40* (2013.01); *G06T 15/005* (2013.01); *G06T 15/405* (2013.01)

(58) Field of Classification Search
None
See application file for complete search history.

(56) References Cited

U.S. PATENT DOCUMENTS

| | | | |
|---|---|---|---|
| 9,232,156 B1 * | 1/2016 | Staudenmaier | ........... G06T 1/60 |
| 2009/0174706 A1 * | 7/2009 | Howson | .................... G06T 1/20 |
| | | | 345/419 |
| 2013/0120380 A1 * | 5/2013 | Kallio | ................... G06T 15/005 |
| | | | 345/421 |

(Continued)

FOREIGN PATENT DOCUMENTS

GB    2517031    2/2015

OTHER PUBLICATIONS

GB Combined Search and Examination Report dated Feb. 28, 2018; GB Patent Application GB1716366.8.

*Primary Examiner* — Edward Martello
(74) *Attorney, Agent, or Firm* — Vierra Magen Marcus LLP

(57) ABSTRACT

A tile-based graphics processing system comprises a graphics processing pipeline comprising a plurality of processing stages, including at least a rasteriser that rasterises input primitives to generate graphics fragments to be processed, and a renderer that processes fragments generated by the rasteriser to generate rendered fragment data, and a tile buffer configured to store data locally to the graphics processing pipeline. The graphics processing system is operable to cause data for use when performing graphics processing operations for each tile of a set of plural tiles of a plurality of tiles to be loaded into the tile buffer before causing graphics processing operations to be performed for any of the tiles of the set of plural tiles.

21 Claims, 6 Drawing Sheets

(56) References Cited

U.S. PATENT DOCUMENTS

2014/0327684 A1* 11/2014 Engh-Halstvedt ........ G06T 1/20
  345/506
2014/0368521 A1* 12/2014 Lassen ...................... G06T 1/60
  345/552
2017/0148204 A1    5/2017 Hakura

* cited by examiner

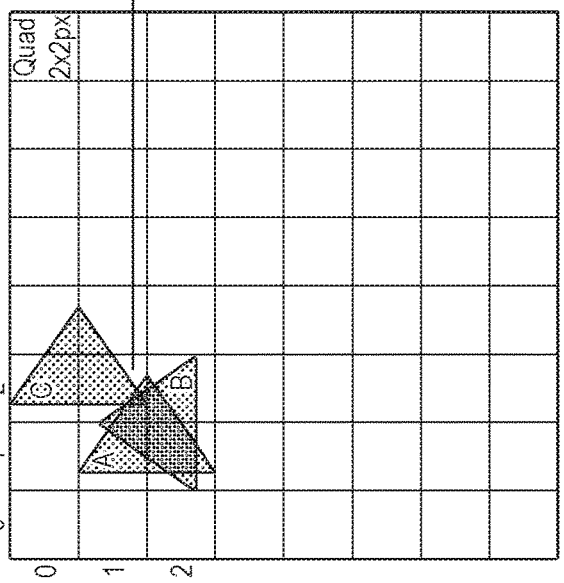
FIG. 7A
Full dependency tracking.
Used for normal fragment processing quads.
FIG. 7B
Preload dependency tracking, using bitmap
FIG. 7C
Preload dependency tracking, using a tile counter

LOADING DATA INTO A TILE BUFFER IN GRAPHICS PROCESSING SYSTEMS

BACKGROUND

The technology described herein relates to graphics processing systems, and in particular to methods of and apparatus for tile-based graphics processing.

Graphics processing typically involves carrying out a sequence of operations on graphics data to generate a final image that is to be displayed. These operations are often carried out in a pipelined fashion using the graphics processing pipeline of a graphics processing unit (GPU).

A number of graphics processing techniques involve controlling the graphics processing unit to generate and store a first array of graphics data in a first rendering pass. Then, in a subsequent rendering pass, the stored first array of graphics data is used by the graphics processing unit when generating a subsequent array of graphics data (which, e.g., may be the final output colour values for display).

In these techniques, the first array of graphics data is typically stored in a memory external to the graphics processing unit (e.g. the main memory of the graphics processing system). When the first array of graphics data is required in the subsequent rendering pass, the graphics processing unit will request that the data is read from the external memory, and will wait until the data is received before continuing with the subsequent rendering pass.

The Applicants believe that there remains scope for improvements to such operations in graphics processing systems.

BRIEF DESCRIPTION OF THE DRAWINGS

A number of embodiments of the technology described herein will now be described by way of example only and with reference to the accompanying drawings, in which:

FIG. 7A shows schematically a conventional fragment dependency tracking mechanism, and FIGS. 7B and 7C show schematically fragment dependency tracking mechanisms in accordance with embodiments of the technology described herein.

Like reference numerals are used for like components where appropriate in the drawings.

DETAILED DESCRIPTION

Figures 1, 2:
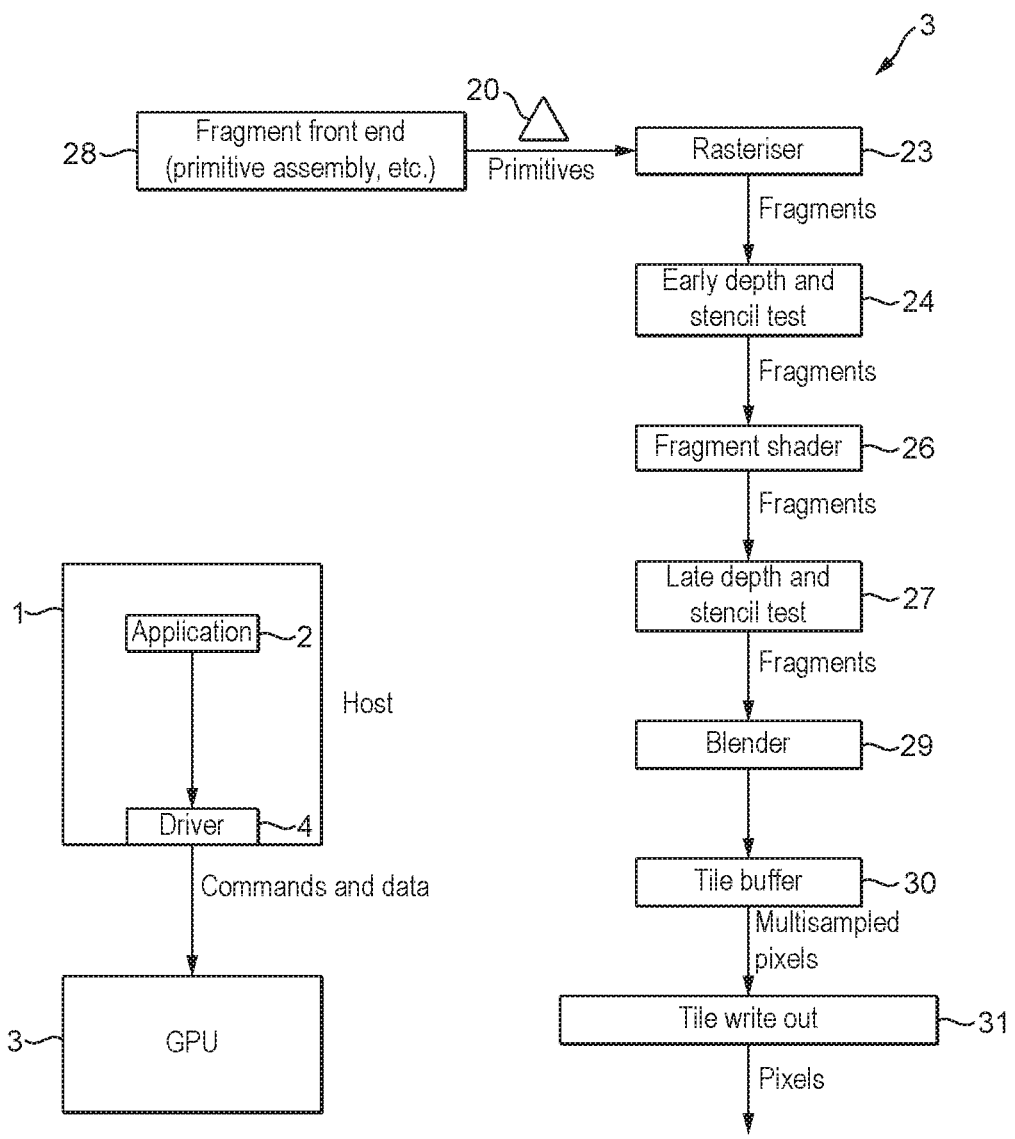
FIG. 1 shows an exemplary computer graphics processing system.
FIG. 2 shows schematically a graphics processing pipeline that can be operated in the manner of the technology described herein.

A first embodiment of the technology described herein comprises a tile-based graphics processing system comprising:

a graphics processing pipeline comprising:
a plurality of processing stages, including at least a rasteriser that rasterises input primitives to generate graphics fragments to be processed, and a renderer that processes fragments generated by the rasteriser to generate rendered fragment data; and
a tile buffer configured to store data locally to the graphics processing pipeline;
wherein the graphics processing system is configured to:
determine, for each tile of a plurality of tiles for which graphics processing operations are to be performed by the graphics processing pipeline, whether data should be loaded into the tile buffer for use by the graphics processing pipeline when performing graphics processing operations for the tile;
for each tile of the plurality of tiles for which it is determined that data should be loaded into the tile buffer, cause the data to be loaded into the tile buffer; and
for each tile of the plurality of tiles for which graphics processing operations are to be performed, cause the graphics processing operations for the tile to be performed by the graphics processing pipeline by causing one or more primitives for the tile to be issued to the rasteriser;
and wherein:
the graphics processing system is operable to cause data for use when performing graphics processing operations for each tile of a set of plural tiles of the plurality of tiles to be loaded into the tile buffer before causing the graphics processing operations to be performed for any of the tiles of the set of plural tiles.

A second embodiment of the technology described herein comprises a method of operating a tile-based graphics processing system that comprises:

a graphics processing pipeline comprising:
a plurality of processing stages, including at least a rasteriser that rasterises input primitives to generate graphics fragments to be processed, and a renderer that processes fragments generated by the rasteriser to generate rendered fragment data; and
a tile buffer configured to store data locally to the graphics processing pipeline;
the method comprising, the graphics processing system:
determining, for each tile of a plurality of tiles for which graphics processing operations are to be performed by the graphics processing pipeline, whether data should be loaded into the tile buffer for use by the graphics processing pipeline when performing graphics processing operations for the tile;
for each tile of the plurality of tiles for which it is determined that data should be loaded into the tile buffer, causing the data to be loaded into the tile buffer; and
for each tile of the plurality of tiles for which graphics processing operations are to be performed, causing the graphics processing operations for the tile to be performed by the graphics processing pipeline by causing one or more primitives for the tile to be issued to the rasteriser;
and wherein the method further comprises:
the graphics processing system causing data for use when performing graphics processing operations for each tile of a set of plural tiles of the plurality of tiles to be loaded into the tile buffer before causing the graphics processing operations to be performed for any of the tiles of the set of plural tiles.

The technology described herein is concerned with tile-based graphics processing methods and systems in which data that is to be used when performing graphics processing operations for a tile is loaded into a tile buffer (e.g. from external memory), and then graphics processing operations are performed for the tile by issuing one or more primitives for the tile to a rasteriser of a graphics processing pipeline. However, unlike in conventional graphics processing systems, in the technology described herein, the graphics processing system is operable to cause data for use when performing graphics processing operations for plural tiles to be loaded into the tile buffer before causing graphics processing operations to be performed for any of those plural tiles.

In other words, before initiating the graphics processing operations (e.g. rasterisation, depth testing, rendering, etc.) for any of the tiles of a set of plural tiles, the graphics processing system is able to cause data that is to be used by the graphics processing pipeline when performing the graphics processing operations for each tile of the set of plural tiles to be pre-loaded into the tile buffer. This is in contrast with conventional graphics processing systems, in which tiles are processed in turn by loading data for use when performing graphics processing operations for a tile into the tile buffer and causing the graphics processing operations to be performed for the tile, and then loading data for use when performing graphics processing operations for the next tile into the tile buffer and causing the graphics processing operations to be performed for the next tile by the graphics processing pipeline, and so on.

As will be explained in more detail below, the arrangement of the technology described herein has a number of benefits.

The Applicants have recognised, in particular, that since in conventional graphics processing systems, the loading of data (e.g. from external memory) into a tile buffer and the graphics processing operations for each tile are initiated in turn, the graphics processing pipeline can be idle for a significant amount of time while it waits for data to be loaded into the tile buffer. Furthermore, in conventional graphics processing systems, at least some of the graphics processing pipeline's resources, such as in particular the tile buffer, can go unused while the graphics processing system waits for data to be loaded into the tile buffer.

In contrast with this and as will be described in more detail below, in the technology described herein, the loading of data (e.g. from external memory) into the tile buffer for each of plural tiles can be scheduled in advance of initiating the graphics processing operations for the tiles. This has the effect of reducing the amount of time that the graphics processing pipeline is idle, and allows the graphics processing pipeline to make more efficient use of its resources, such as in particular its tile buffer.

It will be appreciated, therefore, that the technology described herein provides an improved graphics processing system.

The graphics processing pipeline of the technology described herein has a plurality of processing stages for performing graphics processing operations, including at least a rasteriser and a renderer. The graphics processing pipeline should be (and is in an embodiment) configured to perform other graphics processing operations necessary to generate a desired set of output graphics data (which may, e.g., represent all or part of a frame to be displayed), such as fetching input data, geometry processing, vertex shading, etc.

The graphics processing system should be (and is in an embodiment) configured such that an output to be generated (such as all or part of a frame to be displayed) is divided into a number of similar basic components (so called primitives), e.g. to allow the graphics processing operations to be more easily carried out. The primitives may be in the form of simple polygons, such as triangles.

The graphics primitives may be generated by an applications program interface for the graphics processing system, e.g. using graphics drawing instructions (requests) received from an application (e.g. game) that requires the graphics output. Other arrangements would, however, be possible.

Each primitive may be defined by and represented as a set of vertices. Each vertex for a primitive may have associated with it a set of data (such as position, colour, texture and other attributes data) representing the vertex. This data may then be used when rasterising and rendering the primitive(s) to which the vertex relates, i.e. in order to generate the desired output of the graphics processing system.

Once primitives and their vertices have been generated and defined, they are in an embodiment processed by the graphics processing pipeline, e.g., to display all or part of a frame.

This process in an embodiment involves determining which sampling points of an array of sampling points covering an output area to be processed (e.g. tile) are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This may be done using the positions of the vertices of a primitive.

These processes may be carried out by testing sets of one, or of more than one, sampling point, and then generating for each set of sampling points found to include a sample point that is inside (covered by) the primitive in question (being tested), a discrete graphical entity referred to as a "fragment" on which the subsequent graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a (e.g. 2×2) set of plural sampling points, e.g. depending upon how the graphics processing system is configured.

A "fragment" is therefore effectively (has associated with it) a set of primitive data as interpolated to a given output space sample point or points of a primitive. It may also include per primitive and other state data that is required to shade the primitive at the sample point (fragment position) in question. Each graphics fragment may typically be the same size and location as a "pixel" of the output (e.g. output frame) (since as the pixels are the singularities in the final display, there may be a one to one mapping between the "fragments" the graphics processor operates on (renders) and the pixels of a display). However, it can be the case that there is not a one to one correspondence between a fragment and a display pixel, for example where particular forms of post processing, such as downsampling, are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one to one correspondence between the sampling points and the pixels of a display, but more typically there may not be a one to one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

Thus, the rasteriser of the graphics processing pipeline of the technology described herein in an embodiment generates graphics fragments to be rendered to generate rendered graphics data for sampling points of the desired graphics output, such as a tile or frame to be displayed. Each graphics fragment that is generated by the rasteriser may have associated with it one or more sampling points of the graphics output, and may be used to generate rendered graphics data for one or more of the sampling points of the set of sampling points associated with the fragment.

The rasteriser in an embodiment generates the fragments for rendering by receiving primitives to be rasterised, testing those primitives against sets of sampling point positions, and generating fragments representing the primitives.

Once graphics fragments have been generated, the rendering process in an embodiment then derives the data, such as one or more colour values and optionally an "Alpha" (transparency) value, necessary to represent the primitive at the sample points (i.e. "shades" each sample point). This can involve applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

Thus, the renderer of the graphics processing pipeline of the technology described herein in an embodiment processes fragments generated by the rasteriser to generate rendered fragment data for (covered) sampling points that the fragments represent. These rendering processes may include, for example, fragment shading, blending, texture-mapping, etc.

In an embodiment, the plurality of processing stages of the graphics processing pipeline further comprises a depth test stage (depth test processing circuitry) configured to perform depth testing for fragments generated by the rasteriser. The depth test stage is in an embodiment provided between the rasteriser and the renderer.

The depth test stage in an embodiment depth tests fragments received from the rasteriser, e.g. to determine if any of the fragments can be discarded (culled) at this stage. To do this, it in an embodiment compares the depth values of (associated with) fragments received from the rasteriser with the depth values of (corresponding) fragments that have already been rendered (these depth values are in an embodiment stored in a depth buffer in the tile buffer) to determine whether the received fragments will be occluded by fragments that have already been rendered (or not).

Where it is determined that a received fragment will be occluded, then that fragment is in an embodiment discarded (culled), and is not sent to the renderer. Where it is determined that a received fragment is not occluded (or is only partially occluded), then that fragment is in an embodiment sent to the renderer for rendering.

As such, in an embodiment, only fragments that pass the depth test stage are sent to the renderer, and the renderer in an embodiment only processes (and generates rendered fragment data for) fragments that pass the depth test.

The graphics processing system of the technology described herein is a tile-based graphics processing system. Thus, the graphics processing pipeline will in an embodiment produce tiles of a render output data array, such as an output frame to be generated.

In tile based rendering, rather than the entire render output, e.g., frame, effectively being processed in one go as in immediate mode rendering, the render output, e.g., frame to be displayed, is divided into a plurality of smaller sub regions, referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.

Equally, the graphics processing pipeline of the technology described herein comprises a tile buffer that is in an embodiment configured to store rendered fragment data (at the end of the pipeline), e.g. until a given tile is completed and written out to an external memory, such as a frame buffer, for use. Thus, the tile buffer is in an embodiment configured to store rendered fragment data (produced by the renderer) locally to the graphics processing pipeline, in an embodiment prior to that data being written out to an external memory.

The tile buffer is in an embodiment all or part of a local, on-chip RAM of the graphics processing pipeline. The tile buffer may comprise an allocated amount of memory (e.g. RAM) that is set aside for use as the tile buffer. This may comprise, for example, one or more (e.g. two) colour buffers, e.g. each of a size adequate to store one rendered tile's worth of colour (e.g. RGB or RGBa) data, together with one or more depth and/or depth and stencil buffers, e.g. for storing a tile's worth of depth and/or stencil data.

Thus, the tile buffer is in an embodiment configured to store an array or arrays of sample (e.g. colour or depth) values for one or more tiles. The tile buffer in an embodiment stores data values for an array or arrays of sample positions, with respective sets of the sample positions corresponding to and being associated with respective pixels of an output data array that the rendered fragment data relates to. These sample values are usually, and in an embodiment are, grouped into sets of sample values (such as groups of 2×2 sample values) that are each associated with a respective (e.g. display) pixel in the tile in question.

In order to account for multiple fragments, e.g. from different overlapping primitives, at a given location, the graphics processing pipeline in an embodiment further comprises a blender configured to blend newly generated fragments with fragments already stored in the tile buffer.

In order to facilitate the writing back of rendered graphics data from the tile buffer to external memory, such as a frame buffer, the graphics processing pipeline in an embodiment also includes write out circuitry, e.g. coupled to the tile buffer pipeline memory.

Thus, the plurality of processing stages of the graphics processing pipeline in an embodiment further comprises a write out stage configured to write data stored in the tile buffer to an external memory. The write out stage may operate to write the data in the tile buffer (once the data in the tile buffers is complete) out to external (main) memory (e.g. to a frame buffer). This may include downsampling (averaging), either in a fixed or in a variable fashion, the sample values in the tile buffer to the final output (pixel) value to be written to the main memory (e.g. frame buffer) and/or other output, if desired.

In an embodiment, the graphics processing pipeline further comprises a resource allocator (resource allocator processing circuitry). The resource allocator is in an embodiment operable, inter alia, to allocate (to reserve) space in the tile buffer (e.g. a colour and/or depth buffer) for use by the graphics processing pipeline when processing a tile.

To do this, the resource allocator is in an embodiment configured to receive a plurality of tiles for which graphics processing operations are to be performed, e.g. from an applications program interface or otherwise, and in an embodiment also to receive information indicative of the status of the tile buffer. The resource allocator in an embodiment then determines, for each tile of the plurality of tiles, whether sufficient space (e.g. one or more colour and/or depth buffers) is available for its use in the tile buffer.

When it is determined that sufficient space is available for a tile, then the resource allocator in an embodiment allocates (reserves) that space (e.g. one or more colour and/or depth buffers) for use by the graphics processing pipeline when processing the tile. Once this has been done, the resource allocator in an embodiment then causes the graphics processing operations to be performed for the tile.

In these embodiments, once the tile is completed and written out to external (main) memory (e.g. to a frame buffer), the space in the tile buffer (e.g. colour and/or depth buffer) is in an embodiment freed (un-allocated) for use by one or more other tiles.

In the technology described herein, the plurality of tiles for which graphics processing operations are to be performed may comprise any suitable such tiles and may be generated in any suitable manner.

In an embodiment, the plurality of tiles for which graphics processing operations are to be performed comprises at least some, in an embodiment all, of the tiles that an output array (frame) to be generated has been divided into.

The tiles may be generated by an applications program interface for the graphics processing system, e.g. using graphics drawing instructions (requests) received from an application (e.g. game) that requires the graphics output. Other arrangements would, however, be possible.

The graphics processing system of the technology described herein is configured to determine, for each tile of the plurality of tiles for which graphics processing operations are to be performed, whether data should be loaded into the tile buffer for use by the graphics processing pipeline when performing graphics processing operations for the tile, and for each tile of the plurality of tiles for which it is determined that data should be loaded into the tile buffer, to cause the data to be loaded into the tile buffer.

The graphics processing system may be configured to make the determination in any suitable manner. In an embodiment, the resource allocator is configured to make this determination, e.g. based the information it receives defining the plurality of tiles for which graphics processing operations are to be performed, e.g. that in an embodiment indicates whether or not a particular tile will require data to be loaded into the tile buffer for use when processing the tile.

Correspondingly, the graphics processing system may be configured to cause the data to be loaded into the tile buffer in any suitable manner. In an embodiment, the (resource allocator of the) graphics processing system is configured to issue appropriate commands and data to the graphics processing pipeline to do this.

For example, in one embodiment, for each tile of the plurality of tiles for which it is determined that data should be loaded into the tile buffer, the (resource allocator of the) graphics processing system is configured to issue a pre-load primitive to the graphics processing pipeline, where the pre-load primitive is in an embodiment configured to cause the desired data to be loaded into the tile buffer, e.g. from external memory, for the tile. In this case, each pre-load primitive in an embodiment covers an entire tile, i.e. such that processing of the pre-load primitive by the graphics processing pipeline causes a tile of data to be loaded into the tile buffer. Other arrangements would, however, be possible.

Each such pre-load primitive will be rasterised to generate pre-load graphics fragments to be processed. Each such pre-load fragment will then be provided to the renderer, and will cause the renderer to load corresponding fragment data (e.g. from the external memory) into the tile buffer.

The data (that is loaded into the tile buffer) may comprise any suitable graphics data such as colour and/or depth data, and may be generated in any suitable manner.

In this regard, various graphics processing techniques require data to be loaded (pre-loaded) into the tile buffer for use by the graphics processing pipeline when performing graphics processing operations. In particular, in multi-pass rendering techniques, the graphics processing system may be controlled to generate and store (e.g. in external memory) one or more first arrays of graphics data in a first rendering pass. Then, in a subsequent rendering pass, the stored first array or arrays of graphics data may be used by the graphics processing unit when generating one or more subsequent arrays of graphics data (which, e.g., may be the final output colour values for display) (i.e. by loading all or part of the stored first array or arrays of graphics data into the tile buffer).

Thus, in an embodiment, the data that is loaded into the tile buffer comprises (an array of) data that has been generated in a previous rendering pass, e.g. by the graphics processing pipeline.

Correspondingly, the method in an embodiment comprises (and the graphics processing system is in an embodiment configured for):

generating, in an initial rendering pass, data for use in a subsequent rendering pass;

and then in a subsequent rendering pass:

determining, for each tile of a plurality of tiles for which graphics processing operations are to be performed by the graphics processing pipeline in the subsequent rendering pass, whether data generated in the initial rendering pass should be loaded into the tile buffer for use by the graphics processing pipeline when performing graphics processing operations for the tile in the subsequent rendering pass;

for each tile of the plurality of tiles for which it is determined that data should be loaded into the tile buffer, causing the data to be loaded into the tile buffer; and for each tile of the plurality of tiles for which graphics processing operations are to be performed, causing graphics processing operations for the tile to be performed by the graphics processing pipeline by causing one or more primitives for the tile to be issued to the rasteriser.

In an embodiment, the data that is generated in the first rendering pass is in the form of a plurality of tiles, and the method comprises: for each tile of the plurality of tiles for which it is determined that data should be loaded into the tile buffer, causing a corresponding tile of data generated in the first rendering pass to be loaded into the tile buffer.

Equally, in an embodiment, the data that is generated in the first rendering pass comprises both colour data and depth data. Some or all of the generated data may then be loaded into the tile buffer for use by the graphics processing pipeline when performing graphics processing operations for a tile in the subsequent rendering pass, i.e., the data that is loaded into the tile buffer for use by the graphics processing pipeline when performing graphics processing operations for a tile may comprise colour and/or depth data.

In an embodiment, the data that is generated in the first rendering pass is stored in external memory. Thus, the data that is loaded into the tile buffer is in an embodiment loaded into the tile buffer from external memory.

In these embodiments, the external memory is in an embodiment a memory that is external to the graphics processing pipeline. The external memory may be dedicated memory for storing one or more arrays of data, or it may be part of a memory that is used for other data as well. In an embodiment, the memory is or comprises a frame buffer for storing one or more arrays of (image) data (e.g. frames), e.g. in the main memory of the data processing system.

As described above, the tile buffer of the graphics processing pipeline of the technology described herein in an embodiment comprises an allocated amount of memory (e.g. RAM) that is set aside for use as the tile buffer. As such, the tile buffer will have some maximum amount of data (tiles) that it can store.

Accordingly, in an embodiment, before the graphics processing system causes data to be loaded into the tile buffer, it checks to see whether sufficient space is available in the tile buffer for storing the data.

Thus, in an embodiment, the (resource allocator of the) graphics processing system is configured to determine, for each tile of the plurality of tiles for which graphics processing operations are to be performed by the graphics processing pipeline, whether sufficient space is available in the tile buffer for storing data for use by the graphics processing pipeline when performing graphics processing operations for the tile.

Where, as described above, the tile buffer is divided into one or more depth buffers and one or more colour buffers, the (resource allocator of the) graphics processing system is in an embodiment configured to determine, for each tile of the plurality of tiles, whether a colour and/or depth buffer is available for storing the data for use by the graphics processing pipeline when performing graphics processing operations for the tile.

In these embodiments, where sufficient space (a colour and/or depth buffer) is available, then the (resource allocator of the) graphics processing system in an embodiment allocates (reserves) the space (e.g. buffer) in the tile buffer for storing the data for use by the graphics processing pipeline when performing graphics processing operations for the tile.

Where sufficient space (a colour and/or depth buffer) is not available (is other than available), then the (resource allocator of the) graphics processing system in an embodiment stalls processing for the tile until sufficient space (a buffer) becomes available (and then allocates the space (buffer) in the tile buffer for storing the data for use by the graphics processing pipeline when performing graphics processing operations for the tile).

In these embodiments, when space (a colour and/or depth buffer) in the tile buffer is allocated to a particular tile, the data that is to be used when performing graphics processing operations for that tile is loaded into the allocated space (buffer).

Thus, in an embodiment, the method comprises (and the graphics processing system is configured for):

determining, for each tile of the plurality of tiles for which graphics processing operations are to be performed, whether sufficient space is available in the tile buffer for storing data for use by the graphics processing pipeline when performing graphics processing operations for the tile;

when it is determined that sufficient space is available in the tile buffer for storing the data for use by the graphics processing pipeline when performing graphics processing operations for the tile, allocating space in the tile buffer for use for storing the data for use by the graphics processing pipeline when performing graphics processing operations for the tile; and then for each tile of the plurality of tiles for which it is determined that data should be loaded into the tile buffer, causing the data that is to be used by the graphics processing pipeline when performing graphics processing operations for the tile to be loaded into the allocated space.

In the technology described herein, for each tile of the plurality of tiles for which graphics processing operations are to be performed, the graphics processing system causes the graphics processing operations for the tile to be performed by the graphics processing pipeline by causing one or more primitives for the tile to be issued to the rasteriser.

The graphics processing system may be configured to do this in any suitable manner. In an embodiment, the (resource allocator of the) graphics processing system is configured to send one or more geometric primitives for the tile to the graphics processing pipeline. Each such geometric primitive will, as described above, be rasterised to generate graphics fragments to be processed. Each such graphics fragment will, as described above, then be provided to the renderer for rendering.

Thus, in an embodiment, the graphics processing operations that are caused to be performed by the graphics processing system issuing one or more primitives for a tile to the rasteriser include at least rasterising and rendering.

Correspondingly, the (resource allocator of the) graphics processing system is configured to: for each tile of a plurality of tiles to be processed by the graphics processing pipeline, cause the tile to be processed by the graphics processing pipeline by causing one or more primitives for the tile to be issued to the rasteriser for rasterisation and rendering.

In the technology described herein, the data that is loaded into the tile buffer should be (and is in an embodiment) used by the graphics processing pipeline when performing the graphics processing operations for a tile. As described above, the data that is loaded into the tile buffer may comprise colour and/or depth data.

Where the data comprises colour data, then the colour data may represent an initial version of a tile (e.g. that was generated in an initial rendering pass), and the graphics processing operations for the tile may use the colour data, e.g. by modifying that data, in order to generate (colour data that represents) a subsequent (e.g. final) version of the tile. Such processing can include, for example, the addition of fog effects or similar to the initial version of the tile, blurring and/or sharpening, colour saturation and/or brightness adjustment for the tile, and so on.

It would also or instead be possible, where the data that is loaded into the tile buffer is colour data, for the graphics processing operations for the tile to use the colour data to generate other forms of data (such as depth data).

However, in a particular embodiment, the data that is loaded into the tile buffer and used by the graphics processing pipeline when performing the graphics processing operations for a tile is depth data.

In this regard, the Applicants have recognised that loading depth data into the tile buffer before performing graphics processing operations for a tile can be particularly beneficial since for example, the depth data from an initial rendering pass can be (and is in an embodiment) used in the depth test. This can have the effect of preventing unnecessary processing of fragments that will not affect the final output array (e.g. frame), and so will reduce the amount of processing that is required to be performed by the graphics processing system.

Thus, in an embodiment, the data that is loaded into (a depth buffer of) the tile buffer is depth data, e.g. that is generated in an initial rendering pass, and the graphics processing operations that are performed by the graphics processing system for a tile in an embodiment include depth testing (i.e. at least rasterising, depth testing and rendering).

Accordingly, in these embodiments, the rasteriser will in an embodiment rasterise received primitives to generate graphics fragments to be processed, the depth test stage will then compare the depth values of (associated with) fragments received from the rasteriser with the depth values of (corresponding) fragments that have been loaded into the depth buffer in the tile buffer to determine whether the received fragments will be occluded by fragments that have already been rendered (or not), and the renderer will then process fragments that pass the depth test to generate rendered fragment data.

In the technology described herein, the graphics processing operations performed for each tile will (and in an embodiment do) result in the generation of one or more arrays (tiles) of (e.g. colour and/or depth) data. This (colour and/or depth) data is in an embodiment stored in the tile buffer. As described above, the buffer will have some maximum amount of data (tiles) that it can store.

Accordingly, in an embodiment, before the graphics processing system causes graphics processing operations to be performed for a tile, it checks to see whether sufficient space is available in the tile buffer for storing the data that will be generated by the graphics processing operations for the tile.

Thus, in an embodiment, the (resource allocator of the) graphics processing system is configured to determine, for each tile of the plurality of tiles for which graphics processing operations are to be performed by the graphics processing pipeline, whether sufficient space is available in the tile buffer for storing data that will be generated by the graphics processing pipeline when performing the graphics processing operations for the tile.

Where, as described above the tile buffer is divided into one or more depth buffers and one or more colour buffers, the resource allocator is in an embodiment configured to determine, for each tile of the plurality of tiles for which graphics processing operations are to be performed, whether a colour and/or depth buffer is available for storing the data that will be generated by the graphics processing pipeline when performing graphics processing operations for the tile.

In these embodiments, where sufficient space (a colour and/or depth buffer) is available, then the (resource allocator of the) graphics processing system in an embodiment allocates the space (buffer) in the tile buffer for storing the data that will be generated by the graphics processing pipeline when performing graphics processing operations for the tile.

Where sufficient space (a colour and/or depth buffer) is not available (is other than available), then the (resource allocator of the) graphics processing system in an embodiment stalls processing for the tile until sufficient space (a buffer) becomes available (and then allocates the space (buffer) in the tile buffer for storing the data that will be generated by the graphics processing pipeline when performing graphics processing operations for the tile).

When space (a colour and/or depth buffer) in the tile buffer is allocated to a particular tile, the data that is generated by the graphics processing pipeline when performing graphics processing operations for the tile is stored in the allocated space (buffer).

Thus, in an embodiment, the method comprises (and the graphics processing system is configured to):

determining, for each tile of the plurality of tiles for which graphics processing operations are to be performed, whether sufficient space is available in the tile buffer for storing data that will be generated by the graphics processing pipeline when performing graphics processing operation for the tile;

when it is determined that sufficient space is available in the tile buffer for storing data that will be generated by the graphics processing pipeline when performing graphics processing operations for the tile, allocating space in the tile buffer for use for storing the data that will be generated by the graphics processing pipeline when performing graphics processing operations for the tile; and then for each tile of the plurality of tiles for which graphics processing operations are to be performed, storing data that is generated by the graphics processing pipeline when performing graphics processing operations for the tile in the allocated space.

In an embodiment, where as described above, the data that is to be used by the graphics processing pipeline when performing graphics processing operations for the tile comprises depth data, then the (resource allocator of the) data processing system allocates a depth buffer in the tile buffer for storing depth data (for use when performing the graphics processing operations), and in an embodiment allocates a colour buffer in the tile buffer for storing colour data that will be generated when performing the graphics processing operations. In this case, depth data generated when performing the graphics processing operations can be (and is in an embodiment) stored in the allocated depth buffer.

In these embodiments, it would be possible for the (resource allocator of the) graphics processing system to allocate both space in the tile buffer for use for storing data for use by the graphics processing pipeline when performing graphics processing operations for the tile (e.g. a depth buffer) and space in the tile buffer for use for storing the data that will be generated by the graphics processing pipeline when performing graphics processing operations for the tile (e.g. a colour buffer) at the same time.

However, in an embodiment, the (resource allocator of the) graphics processing system is configured to initially allocate space in the tile buffer for use for storing the data for use by the graphics processing pipeline when performing graphics processing operations for the tile and then to subsequently allocate space in the tile buffer for use for storing data that is to be generated by the graphics processing pipeline when performing graphics processing operations for the tile.

In an embodiment, the (resource allocator of the) graphics processing system is configured to initially allocate a depth buffer in the tile buffer (e.g. for use for storing depth data for use by the graphics processing pipeline when performing graphics processing operations) for the tile and then to subsequently allocate a colour buffer in the tile buffer (e.g. for use for storing colour data that is to be generated by the graphics processing pipeline when performing graphics processing operations) for the tile. (In this case, the depth buffer that is initially allocated for the tile may also be used for storing depth data that is generated by the graphics processing pipeline when performing the graphics processing operations for the tile.)

This is in contrast with conventional graphics processing systems in which both a depth buffer and a colour buffer are allocated to a tile at the same time, i.e. before any data is loaded into the tile buffer for use when processing the tile, and before any graphics processing operations are performed for the tile.

The Applicants have recognised that the initially allocating a depth buffer and then subsequently allocating a colour buffer in this manner can result in a more efficient use of the limited space in the tile buffer. In this regard, as described above, the (depth) data that is to be used when performing graphics processing operations for a tile is in an embodiment stored in an external memory, and so loading that data into the tile buffer can take a significant amount of time. Since in conventional graphics processing systems, both a colour and a depth buffer are allocated to a tile before any processing begins, both buffers will be allocated to the tile, and will accordingly be unavailable for use by other tiles, during the time taken for the data to be loaded into the tile buffer from external memory.

In contrast with this, in the technology described herein, only a depth buffer is allocated to a tile when the loading of data from external memory into the tile buffer is initiated (and in an embodiment while the data is being loaded from external memory into the tile buffer), and the colour buffer can be (and is in an embodiment) allocated later, thereby allowing the colour buffer to be made use of during this time, e.g. for one or more other tiles.

Thus, in an embodiment, the method of the technology described herein comprises:

determining, for each tile of the plurality of tiles for which graphics processing operations are to be performed, whether a depth buffer is available in the tile buffer for storing depth data for use by the graphics processing pipeline when performing graphics processing operations for the tile;

when it is determined that a depth buffer is available in the tile buffer for storing the depth data, allocating a depth buffer in the tile buffer for use for storing the depth data; and then for each tile of the plurality of tiles for which it is determined that depth data should be loaded into the tile buffer for use when performing graphics processing operations for the tile, causing the depth data to be loaded into the allocated depth buffer;

the method further comprising subsequently:

determining, for each tile of the plurality of tiles for which graphics processing operations are to be performed, whether a colour buffer is available in the tile buffer for storing colour data that will be generated by the graphics processing pipeline when performing the graphics processing operations for the tile;

when it is determined that a colour buffer is available in the tile buffer for storing the colour data, allocating a colour buffer in the tile buffer for use for storing the colour data; and then for each tile of the plurality of tiles for which graphics processing operations are to be performed, storing colour data that is generated by the graphics processing pipeline when performing the graphics processing operations for the tile in the allocated colour buffer.

In these embodiments, depth data generated by the graphics processing pipeline when performing the graphics processing operations for the tile can be (and is in an embodiment) stored in the allocated depth buffer.

It is believed that the idea of initially allocating a depth buffer to a tile (e.g. to store pre-loaded depth data), and then subsequently allocating a colour buffer to the tile (e.g. to store colour data generated when performing graphics processing operations for the tile) is new and advantageous in its own right.

Thus, another embodiment of the technology described herein comprises a method of operating a graphics processing system that comprises a graphics processing pipeline and a tile buffer configured to store data locally to the graphics processing pipeline, the method comprising:

for each tile of a plurality of tiles for which graphics processing operations are to be performed by the graphics processing pipeline:

allocating a depth buffer in the tile buffer to the tile for storing depth data for use by the graphics processing pipeline when performing graphics processing operations for the tile;

causing depth data for use by the graphics processing pipeline when performing graphics processing operations for the tile to be loaded into the allocated depth buffer; and then allocating a colour buffer in the tile buffer to the tile for use by the graphics processing pipeline for storing colour data generated by the graphics processing pipeline when performing graphics processing operations for the tile;

the method further comprising:

the graphics processing pipeline using the depth data stored in the allocated depth buffer when performing graphics processing operations for the tile and storing colour data generated by the graphics processing operations in the allocated colour buffer.

Another embodiment of the technology described herein comprises a graphics processing system, the graphics processing system comprising:

a graphics processing pipeline; and a tile buffer configured to store data locally to the graphics processing pipeline; and wherein:

the graphics processing system is configured to, for each tile of a plurality of tiles for which graphics processing operations are to be performed by the graphics processing pipeline:

allocate a depth buffer in the tile buffer to the tile for storing depth data for use by the graphics processing pipeline when performing graphics processing operations for the tile;

cause depth data for use by the graphics processing pipeline when performing graphics processing operations for the tile to be loaded into the allocated depth buffer; and then allocate a colour buffer in the tile buffer to the tile for use by the graphics processing pipeline for storing colour data generated by the graphics processing pipeline when performing graphics processing operations for the tile;

wherein the graphics processing pipeline is configured to:

use the depth data stored in the allocated depth buffer when performing graphics processing operations for the tile and store colour data generated by the graphics processing operations in the allocated colour buffer.

These embodiments can, and in an embodiment do, include any one or more or all of the optional features described herein.

Thus, for example, the graphics processing system is in an embodiment configured to determine, for each tile of the plurality of tiles for which graphics processing operations are to be performed by the graphics processing pipeline, whether depth data should be loaded into the depth buffer for use by the graphics processing pipeline when performing graphics processing operations for the tile, and to cause the depth data to be loaded into the allocated depth buffer for each tile of the plurality of tiles for which it is determined that depth data should be loaded into the depth buffer, e.g. and in an embodiment as described above.

The graphics processing system is in an embodiment configured, for each tile of the plurality of tiles for which graphics processing operations are to be performed, to cause the graphics processing operations for the tile to be performed by the graphics processing pipeline by causing one or more primitives for the tile to be issued to the rasteriser, e.g. and in an embodiment as described above.

Similarly, the graphics processing system is in an embodiment operable to cause depth data for use when performing graphics processing operations for each tile of a set of plural tiles of the plurality of tiles to be loaded into the tile buffer before causing the graphics processing operations to be performed for any of the tiles of the set of plural tiles, e.g. and in an embodiment as described above.

In the technology described herein, the graphics processing system is operable to cause data for use when performing graphics processing operations for each tile of a set of plural tiles of the plurality of tiles to be loaded into the tile buffer before causing the graphics processing operations to be performed for any of the tiles of the set of plural tiles.

In other words, before initiating the (e.g. rasterisation, depth testing, rendering, etc.) processing of any one of a set of plural tiles by the graphics processing pipeline, the graphics processing system is able to cause data that is to be used by the graphics processing pipeline when processing the plural tiles to be pre-loaded into the tile buffer.

In this regard, the Applicants have recognised that the tile buffer will often have space available for depth data, i.e. a depth buffer, even when the colour buffer(s) is full. This is because it can often be (and in an embodiment it is) the case that the depth buffer has sufficient space (allocated RAM) to support multisampled arrangements, but that the graphics processing pipeline is configured to operate without using multisampling (or at least while using fewer sampling points per fragment than are available for use).

Thus, in an embodiment, the graphics processing system is configured such that the depth buffer of the tile buffer can be allocated for (and used to store depth data for) plural tiles.

In the technology described herein, by allowing the loading of data (e.g. from external memory) into the tile buffer for each of plural tiles to be scheduled in advance of initiating the graphics processing operations for the tiles, the amount of time that the graphics processing pipeline is idle while it waits for the data to be loaded into the tile buffer can be reduced.

This is because, in conventional graphics processing systems, for each tile in turn, the graphics processing system causes the data that will be used when processing the tile to be loaded into the tile buffer, and then causes the graphics processing operations for the tile to be performed by the graphics processing pipeline by issuing one or more primitives for the tile to the rasteriser. In this case, when the data that is to be used when performing the graphics processing operations is required by the graphics processing pipeline, but has not yet been loaded into the tile buffer (e.g. due to the external memory latency), the graphics processing pipeline will wait until the data is available before continuing with its graphics processing operations.

In contrast with this, in the technology described herein, rather than the graphics processing pipeline causing graphics processing operations to be performed for a tile (immediately) after causing data that will be used when performing the graphics processing operations for the tile to be loaded into the tile buffer, it can instead (and in an embodiment does) cause data for use when performing graphics processing operations for one or more other (e.g. the one or more next) tiles to be loaded into the tile buffer.

In other words, in the time that the graphics processing pipeline would conventionally be waiting for the data to be loaded into the tile buffer, the graphics processing pipeline of the technology described herein can (and in an embodiment does) use that time to cause data to be loaded into the tile buffer for one or more other tiles.

Once the graphics processing system has caused the data for plural tiles to be loaded into the tile buffer, it can (and in an embodiment does) then cause graphics processing operations to be performed for one or more of the plural tiles. When the graphics processing operations for these tiles require data from the tile buffer, that data may already be present in the tile buffer (so that the graphics processing pipeline need not wait before continuing with its graphics processing operations), or that data may arrive sooner than would be the case in the conventional arrangement, e.g. since the loading of the data may have been initiated earlier than would otherwise be the case.

In the technology described herein, the graphics processing system may cause (e.g. depth) data for any number of plural tiles to be loaded into the tile buffer (e.g. depth buffer) before causing the graphics processing operations to be performed for those tiles.

The graphics processing system should (and in an embodiment does) cause data for at least a first and one or more second tiles of the plurality of tiles to be loaded into the tile buffer before causing graphics processing operations to be performed for those tiles.

Thus, in an embodiment, the method comprises:
causing data that is to be used by the graphics processor when performing graphics processing operations for a first tile of the plurality of tiles to be loaded into the tile buffer;
causing data that is to be used by the graphics processor when performing graphics processing operations for one or more second tiles of the plurality of tiles to be loaded into the tile buffer; and
subsequently causing the graphics processing pipeline to perform graphics processing operations for the first tile by issuing one or more primitives for the first tile to the rasteriser.

The method in an embodiment further comprises subsequently causing the graphics processing pipeline to perform graphics processing operations for the one or more second tiles by issuing one or more primitives for the one or more second tiles to the rasteriser.

The particular number of plural tiles for which data is pre-loaded into the tile buffer in an embodiment depends on how much space is available for use in the tile buffer (e.g. depth buffer). In an embodiment, the (resource allocator of the) graphics processing system is configured to cause (e.g. depth) data for as many tiles as possible to be loaded into the tile buffer (e.g. depth buffer) before causing graphics processing operations to be performed for any of the tiles. Other arrangements would, however, be possible.

In the technology described herein, when the data loaded into the tile buffer is to be used by the graphics processing pipeline (e.g. when the graphics processing pipeline is to perform the depth test), the graphics processing pipeline in an embodiment determines whether or not the data has been loaded into the tile buffer for its use. The graphics processing system may determine when the data has been loaded into the tile buffer in any suitable manner.

In one embodiment, the graphics processing system is configured to maintain plural pieces of information for each tile, e.g. in the form of a bitmap, where each piece of information corresponds to a fragment of the tile. When the data for a particular fragment has been successfully loaded into the tile buffer, the corresponding piece of information may be altered to indicate this fact (e.g. the bit may be flipped). The graphics processing system may then determine that all of the data has been loaded into the tile buffer when each of the pieces of information for a tile (e.g. all of the bits in the bitmap) indicate that the data for each of the fragments have been successfully loaded into the tile buffer.

In this embodiment, the graphics processing system could also or instead determine that a portion (some but not all) of the data has been loaded into the tile buffer, e.g. when each of the pieces of information for a portion of a tile (e.g. each of the bits in the bitmap for a portion of the tile) indicate that the data for each fragment has been successfully loaded into the tile buffer. This can be used, e.g. to reduce the idle time of the graphics processing pipeline further, e.g. by allowing the graphics processing pipeline to perform graphics processing operations for individual fragments or portions of a tile, even when an entire tile of data has not yet been loaded into the tile buffer.

Thus, in an embodiment, the graphics processing system is configured, for each tile for which it is determined that data should be loaded into the tile buffer, to:

load the data into the tile buffer by loading data for each of plural fragments for the tile into the tile buffer; and for each fragment for the tile, to:

update a corresponding piece of information when the data for the fragment has been loaded into the tile buffer.

Correspondingly, the graphics processing pipeline is in an embodiment configured, for each tile for which it is determined that data should be loaded into the tile buffer, to:

when performing the graphics processing operations for the tile, determine whether the data has been loaded into the tile buffer using the information.

In another embodiment, the graphics processing system is configured to maintain a counter for each tile. The graphics processing system may use the counter to count the fragments for each tile which data has been successfully loaded into the tile buffer. The graphics processing system may then determine that all of the data has been loaded into the tile buffer when the counter is equal to the total number of fragments in a tile. This embodiment beneficially requires less data storage, e.g. when compared with using a bitmap.

Thus, in an embodiment, the graphics processing system is configured, for each tile for which it is determined that data should be loaded into the tile buffer, to:

load the data into the tile buffer by loading data for each of plural fragments for the tile into the tile buffer; and for each fragment for the tile, to:

update a counter when the data for the fragment has been loaded into the tile buffer.

Updating the counter may comprise incrementing or decrementing the counter when the data for the fragment has been loaded into the tile buffer.

Correspondingly, the graphics processing pipeline is in an embodiment configured, for each tile for which it is determined that data should be loaded into the tile buffer, to:

when performing the graphics processing operations for the tile, determine whether the data has been loaded into the tile buffer using the counter.

Other arrangements would, however, be possible.

The Applicants have furthermore recognised that these simplified dependency tracking mechanisms (that operate on a per tile basis rather than on a per fragment basis) could be used in other contexts.

For example, when the graphics processing operations for a tile have been completed, it may be desired to further process the generated rendered fragment (e.g. colour and/or depth) data. Conventionally, each fragment that is used to perform this further processing will have a dependency on each prior fragment at the same position in the tile to complete. If the graphics processing operations for these further fragments are initiated too early, the graphics processing pipeline may have to wait until the graphics processing operations for each of the prior fragments (which may be complex and time consuming) complete. This can mean that resources of the graphics processing system that are allocated to the post processing fragments can be wasted.

According to various embodiments, the (resource allocator of the) graphics processing pipeline is configured to wait until the graphics processing operations for every fragment in a tile have been completed before initiating any post-processing graphics processing operations for the tile (i.e. before initiating the graphics processing operations for any of the further fragments). This can reduce the amount of time for which the graphics processing pipeline is idle.

It is believed that this technique is new and advantageous in its own right.

Thus, another embodiment of the technology described herein comprises a tile-based graphics processing system comprising:

a graphics processing pipeline comprising:
  a plurality of processing stages, including at least a rasteriser that rasterises input primitives to generate graphics fragments to be processed, and a renderer that processes fragments generated by the rasteriser to generate rendered fragment data; and
  a tile buffer configured to store data locally to the graphics processing pipeline;
wherein the graphics processing system is configured to:
  perform graphics processing operations for a tile by performing graphics processing operations for each of plural fragments for the tile; and
  store data generated by the graphics processing pipeline when performing the graphics processing operations for each of the plural fragments for the tile in the tile buffer;
and wherein:
the graphics processing system is operable to, when the data generated by the graphics processing pipeline for the tile is to be used by the graphics processing pipeline when performing further graphics processing operations for the tile:
  determine whether the graphics processing operations have been performed for all of the plural fragments for the tile; and
  when it is determined that the graphics processing operations have been performed for all of the plural fragments for the tile, cause the further graphics processing operations for the tile to be performed by the graphics processing pipeline.

Another embodiment of the technology described herein comprises a method of operating a tile-based graphics processing system that comprises:

a graphics processing pipeline comprising:
a plurality of processing stages, including at least a rasteriser that rasterises input primitives to generate graphics fragments to be processed, and a renderer that processes fragments generated by the rasteriser to generate rendered fragment data; and
a tile buffer configured to store data locally to the graphics processing pipeline;
the method comprising, the graphics processing system:
performing graphics processing operations for a tile by performing graphics processing operations for each of plural fragments for the tile; and
storing data generated by the graphics processing operations performed for each of the plural fragments for the tile in the tile buffer;
and wherein the method further comprises the graphics processing system, when the data generated by the graphics processing pipeline for the tile is to be used by the graphics processing pipeline when performing further graphics processing operations for the tile:
determining whether the graphics processing operations have been performed for all of the plural fragments for the tile; and
when it is determined that the graphics processing operations have been performed for all of the plural fragments for the tile, causing the further graphics processing operations for the tile to be performed by the graphics processing pipeline.

It will be appreciated that these embodiments can, and in an embodiment do, include any one or more or all of the optional features described herein.

Thus, for example, the (resource allocator of the) graphics processing system is in an embodiment configured to cause the graphics processing operations for the tile to be performed by the graphics processing pipeline by causing one or more primitives for the tile to be issued to the rasteriser, e.g. and in an embodiment as described above. The primitives are in an embodiment then rasterised to generate the plural fragments for which graphics processing operations are performed for the tile.

Correspondingly, the (resource allocator of the) graphics processing system is in an embodiment configured to cause the further graphics processing operations for the tile to be performed by the graphics processing pipeline by causing one or more further primitives for the tile to be issued to the rasteriser, e.g. and in an embodiment as described above.

In one embodiment, the graphics processing system is configured to: for each of the plural fragments for the tile, update a corresponding piece of information when the graphics processing operations for the fragment have been performed, e.g. and in an embodiment in the manner described above. In this case, the (resource allocator of the) graphics processing system is in an embodiment operable to determine whether the graphics processing operations have been performed for all of the plural fragments for the tile using the information, e.g. and in an embodiment as described above.

In another embodiment, the graphics processing system is configured to: for each of the plural fragments for the tile, update a counter when the graphics processing operations for the fragment have been performed, e.g. and in an embodiment in the manner described above. In this case, the (resource allocator of the) graphics processing system is in an embodiment operable to determine whether the graphics processing operations have been performed for all of the plural fragments for the tile using the counter, e.g. and in an embodiment as described above.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

FIG. 1 shows a typical computer graphics processing system. An application 2, such as a game, executing on host processor 1 will require graphics processing operations to be performed by an associated graphics processor 3. To do this, the application will generate API calls that are interpreted by a driver 4 for the graphics processor 3 that is running on the host processor 1 to generate appropriate commands to the graphics processor 3 to generate the graphics output required by the application 2.

FIG. 2 shows the graphics processor 3 of the present embodiment in more detail.

The graphics processor 3 shown in FIG. 2 is a tile based graphics processing pipeline and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

FIG. 2 shows schematically the pipeline stages after the graphics primitives (polygons) 20 for input to the rasterisation process have been generated. Thus, at this point the graphics data (the vertex data) has undergone fragment frontend operations 28, such as transformation and lighting operations (not shown), and a primitive set up stage (not shown) to set up the primitives to be rendered, in response to the commands and vertex data provided to the graphics processor.

As shown in FIG. 2, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z buffer within the tile buffer 30. (The colour buffer and Z buffer will store an appropriate colour, etc., or Z value, respectively, for each sampling point that the buffers represent (in essence for each sampling point of a tile that is being processed).) The colour buffer and Z-buffer store an array of fragment data that represents part of the render output (e.g. image to be displayed).

In the present embodiment, the tile buffer 30 comprises an allocated portion of RAM that is located on (local to) the graphics processing pipeline (on-chip).

The, e.g. colour, data from the tile buffer 30 is input to a downsampling (multisample resolve) write out unit 31, and thence output (written back) to an output buffer, such as a frame buffer of a display device (not shown). (The display device could comprise, e.g., a display comprising an array of pixels, such as a computer monitor or a printer.)

The downsampling unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 3 would, of course, be possible.

FIG. 3 again shows the graphics processor 3 of the present embodiment in more detail.

Figure 3:
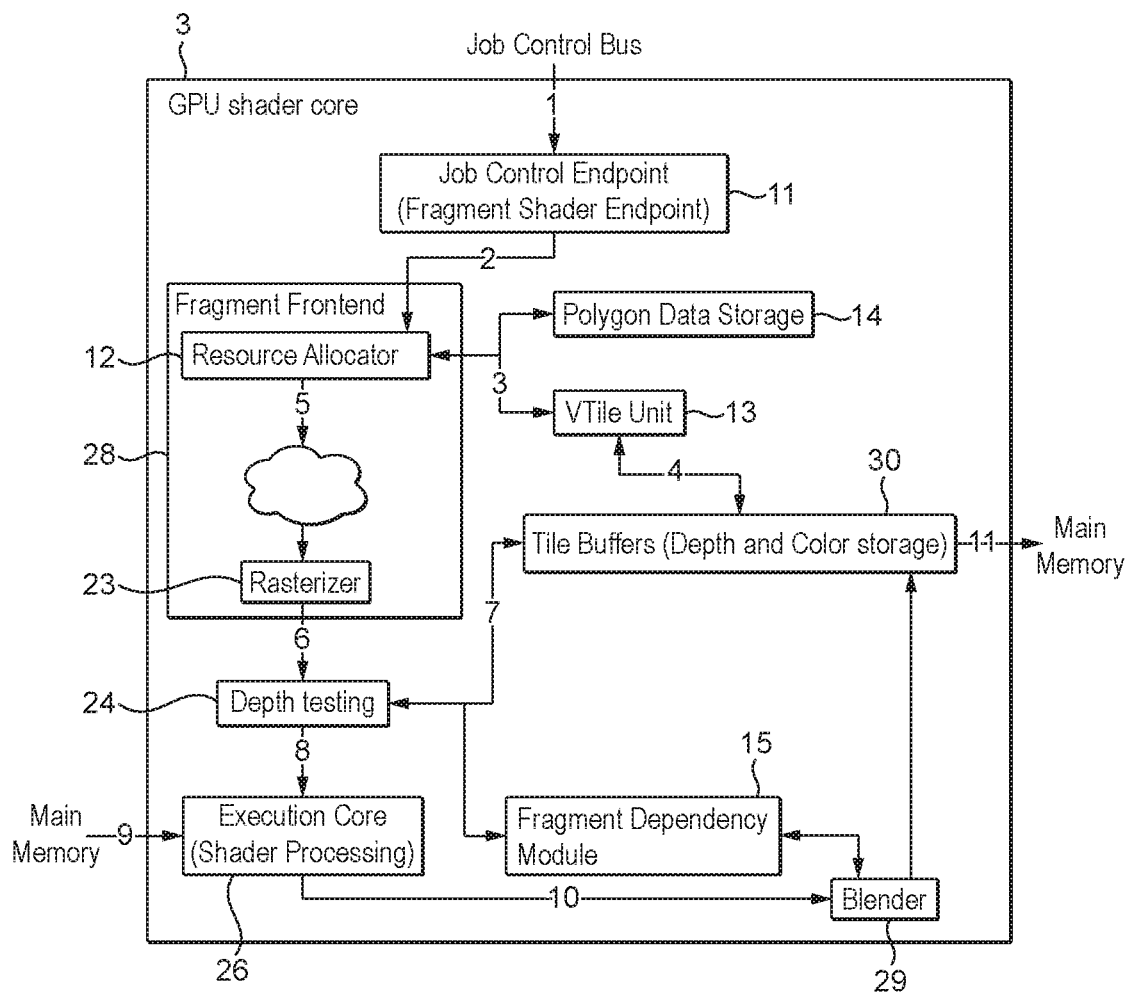
FIG. 3 shows schematically a graphics processing system that can be operated in the manner of the technology described herein.

As shown in FIG. 3, when it is desired for the GPU 3 to generate an output, the driver 4 for the GPU 3 signals to the fragment shader endpoint 11 to start processing one or more tiles. The fragment shader endpoint 11 then signals to the fragment frontend 28 to start processing a specific tile.

As shown in FIG. 3, the fragment frontend 28 comprises a resource allocator 12. The resource allocator's primary purpose is to allocate the GPU's resources, such as in particular the tile buffer 30, for the processing of a particular tile.

When the fragment shader endpoint 11 signals to the fragment frontend 28 to start processing a specific tile, the resource allocator 12 determines which of the GPU's 3 resource will be required, and requests the required resources from various other modules. If the requires resources are not available, the resource allocator 12 stalls until they become available.

Figure 4:
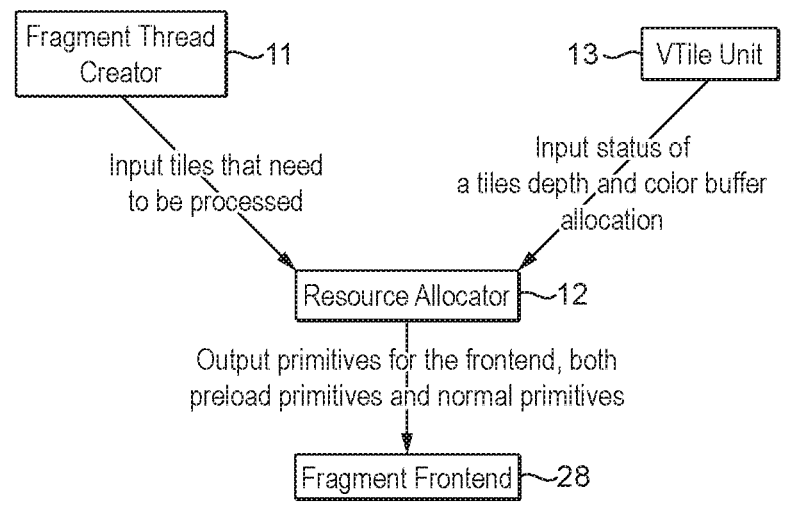
FIG. 4 shows schematically a resource allocator that can be operated in the manner of the technology described herein.

FIG. 4 illustrates the resource allocator 12 in more detail. As shown in FIG. 4, the resource allocator 12 receives inputs indicating the tiles that are to be processed, and the status of the tile buffer 30 from a so-called "VTile unit" 13 that controls the tile buffer resource, and choose how the storage is utilised.

Returning now to FIG. 3, once all of the required resources have been allocated, the resource allocator releases the tile for further processing in the fragment frontend 28. The geometry and primitives of the tile are fetched, e.g. from polygon data storage 14, and sent to the rasterise 23 for rasterisation.

Each geometry primitive is rasterised, to turn each primitive into a sequence of fragments (e.g. so-called "quads" (2×2 set of sampling points)). These are then sent for depth testing 24.

Where more than one quad has the same position in the tile (e.g. where the quads are from different primitives), the result of the depth test 24 for a quad at that position will depend on the depth value of the previous primitive.

As such, the previous depth value is fetched from the depth storage in the tile buffer 30. If the depth value is not available, e.g. due to a dependency, the quad may either be stalled until the depth value is available (at the cost of slowing down the rendering), or the depth testing may be deferred to after shader processing (at the cost of potentially processing a fragment that may not be visible in the end).

The depth value of the current primitive/fragment is normally calculated from its vertex positions. Alternatively, it can be read from memory, e.g. where it comes from a previous render-pass. If depth values need to be read from memory, then this is handled by the execution core 26.

The depth test 24 compares the depth of the current primitive/fragment with the previous one, and decides if the current primitive/fragment is visible in the scene.

Once the depth testing 24 is complete (or deferred), the execution core 26 performs the shader processing for the quad. This includes texturing, colouring, etc. During the shader processing, the execution core 26 can read data from main memory. For example, if the quad is the first quad during the second pass of a multipass rendering operation, the depth value is read from memory.

After shader processing, the final colour and depth of the quad is written back to the tile buffer 30 colour and depth storage. The completed tile buffers are written back to the main memory once each tile is done. Once a tile has been written back to main memory, the tile is freed and can be reused by the VTile unit 13.

In the present embodiment, the graphics processing pipeline 3 is controlled to perform multiple rendering passes, by generating and storing in external memory a first array of graphics data in a first rendering pass, and then using the stored array of graphics data when generating a subsequent array of graphics data in a subsequent rendering pass. In the second rendering pass, data generated in the first pass is pre-loaded into the tile buffer 30 for use by the graphics processing pipeline 3 when processing one or more tiles.

For example, in the first pass, the GPU 3 may render a set of colour buffers and a depth buffer with inputs to the lighting equations to be done in the later pass. In the second pass, the GPU 3 can take the rendered colour buffers and do lighting computations on them, where the colour buffers rendered in the earlier pass are read, e.g. from the texture mapper.

For the second pass it can be beneficial to preserve the depth buffer that was written in the first pass, e.g. to allow fast culling of new geometry and/or light calculations that should not be visible due to being occluded by another rendered object. Preservation of a buffer in a tiled based architecture typically involves reading the data from external memory into the GPU internal tile buffer 30 before starting rendering the new content. However, the memory latency is very significant.

In the second pass, it is beneficial for the depth buffer to be read before any other processing happens for a tile, i.e. to enable early depth testing 24 using the preserved depth buffer.

In the conventional system, this means that the GPU 3 either has to wait for the pre-load to happen until it can start the tile (which takes a significant amount of time and can drain various FIFOs in the pipeline 3) or it can push the fragments for late testing 37 (which carries a large performance overhead).

Figure 5A:
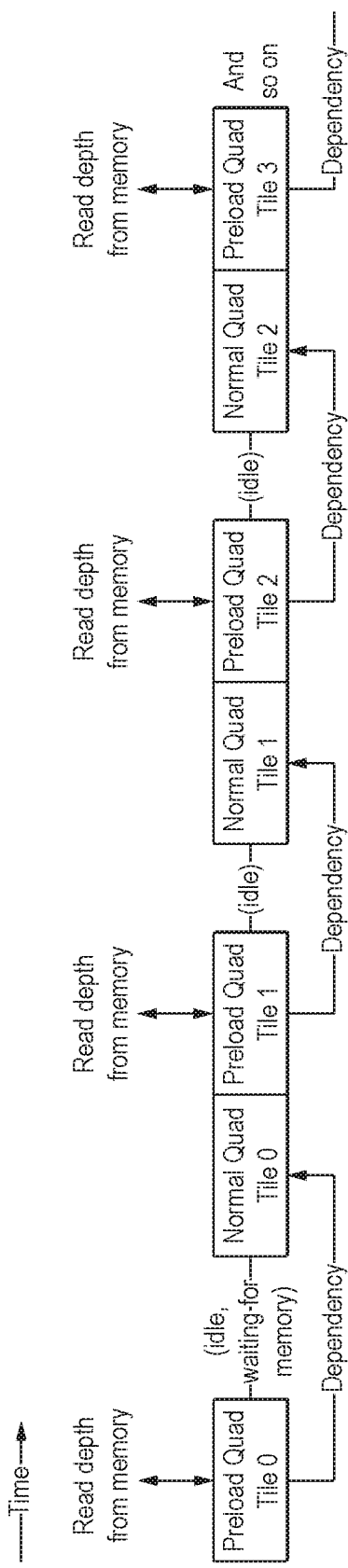
FIG. 5A shows schematically a conventional technique for operating a graphics processing pipeline.

FIG. 5A illustrates this conventional technique for performing multipass rendering. As shown in FIG. 5A, in the conventional technique, tiles are processed in turn by loading data for use when processing a first tile ("Preload Quad Tile 0") into the tile buffer and processing the tile ("Normal Quad Tile 0"), and then loading data for the next tile ("Preload Quad Tile 1") into the tile buffer and processing the next tile ("Normal Quad Tile 1"), and so on.

As shown in FIG. 5A, this arrangement means that the graphics processing pipeline 3 can be idle for a significant amount of time while it waits for data to be loaded into the tile buffer 30. Furthermore, in this case the tile buffer 30 will go at least partially unused while the graphics processing pipeline 3 waits for data to be loaded into the tile buffer 30.

In the present embodiment, to make this process more efficient, depth preloads are marked as eligible for early scheduling. They are then processed as early as possible, given a set of restrictions: the tile must have space in the tile buffer 30 allocated to it, and the pre-load quads must not be reordered past quads later on in the pipeline 3, i.e. to prevent the GPU 3 from running out of physical tiles (with the typical 8 physical tiles, there is some wiggle room here, so some reordering can still happen)

One reason this works is that for most content there is typically plenty of depth buffer tiles available, since even if the colour buffer is occupied with multiple render target (MRT) configurations, the depth buffer is typically scaled for multi-sample anti-aliasing (MSAA), and when the GPU 3 uses single sampling there will be plenty of depth buffers (8 in most implementations) available.

In short the present embodiment comprises conditional interleaving for some (pre-load) primitives where it is most beneficial, still pushing these primitives through the regular pipeline 3 to keep things simple.

Figure 5B:
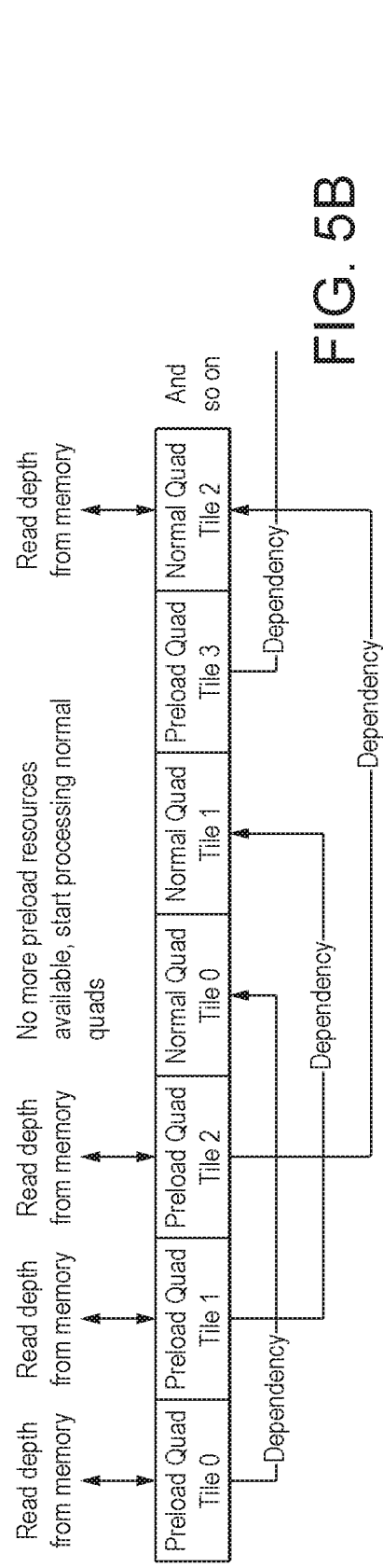
FIG. 5B shows schematically a technique for operating a graphics processing pipeline in accordance with an embodiment of the technology described herein.

As shown in FIG. 5B, in the present embodiment, the graphics processing pipeline 3 is controlled to initiate loading of data for plural tiles ("Preload Quad Tile 0", "Preload Quad Tile 1", etc.) into the tile buffer before initiating processing (e.g. rasterisation, depth testing, rendering, etc.) of any of those plural tiles ("Normal Quad Tile 0", "Normal Quad Tile 1", etc.

The resource allocator 12 causes depth data for as many tiles as possible to be pre-loaded into the tile buffer before causing graphics processing operations to be performed for any of the tiles.

As shown in FIG. 5B, this has the effect of reducing the amount of time that the graphics processing pipeline is idle while it waits for data to be loaded into the tile buffer 30. This is because in the time that the graphics processing pipeline 3 would conventionally be waiting for the data to be loaded into the tile buffer 30, the graphics processing pipeline 3 can instead use that time to initiate loading of data into the tile buffer 30 for one or more other tiles.

Once the loading of data for plural tiles has initiated (by issuing a pre-load primitive to the rasteriser 23), the graphics processing operations for the tiles can be initiated (by issuing geometric primitives to the rasteriser 23). When the depth test for these tiles require data from the tile buffer 30, that data may already be present in the tile buffer 30, or that data may arrive sooner than would be the case in the conventional arrangement, e.g. since the loading of the data will have been initiated earlier than would otherwise be the case.

It will be appreciated that in the present embodiment, pre-loading of data for a tile is initiated before beginning normal processing for tile in order to mask the memory latency.

Figure 6:
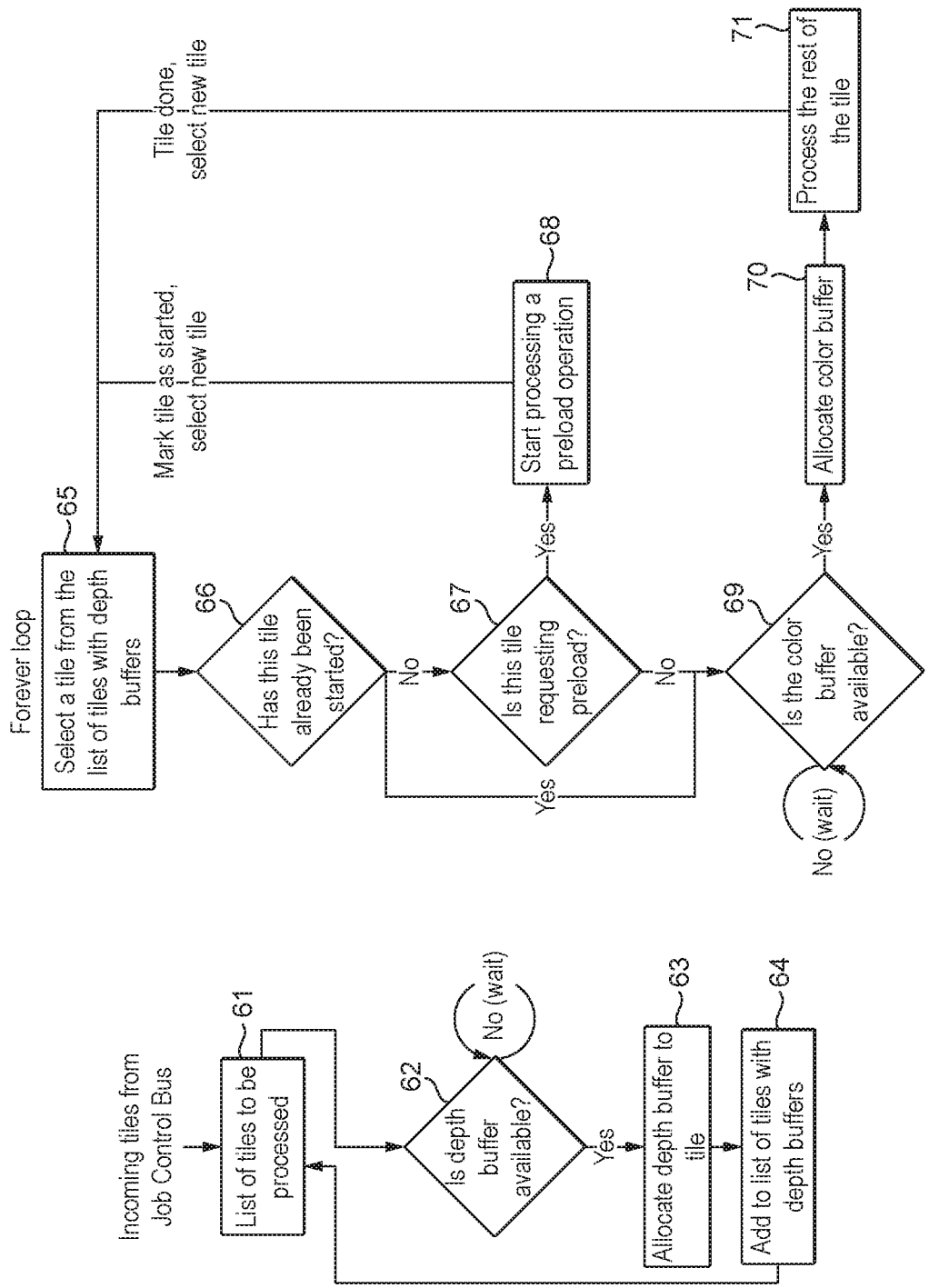
FIG. 6 shows schematically a technique for operating a graphics processing pipeline in accordance with an embodiment of the technology described herein.

FIG. 6 shows a flow chart that illustrates the present embodiment.

As shown in FIG. 6, the resource allocator 12 receives a list of tiles to be processed (step 61). The resource allocator 12 then determines, for each tile, whether a depth buffer is available for the tile (step 62). If a depth buffer is not available, the processing for the tile is stalled until a depth buffer becomes available.

When a depth buffer is available for the tile, it is allocated to the tile (step 63). The resource allocator 12 then adds the tile to a list of tiles for which a depth buffer has been allocated (step 64). This process is repeated for each tile in the list of tiles to be processed.

As also shown in FIG. 6, tiles are selected from the list of tiles for which a depth buffer has been allocated (step 65), and for each tile from the list, it is determined whether processing for that tile has been started (step 66). If not, it is determined whether the tile will require depth data to be pre-loaded into the tile buffer 30 for use by the graphics processing pipeline 3 when processing the tile (step 67).

For tiles that require data to be pre-loaded into the tile buffer 30, the resource allocator 12 starts pre-loading of the data (step 68) by issuing a pre-load primitive to the graphics processing pipeline 3 that causes the appropriate data to be loaded into the tile buffer 30.

In this case, each pre-load primitive will correspond to the entire tile, i.e. so that processing of the primitive causes all of the data that is required to be loaded into the tile buffer for a tile to be loaded into the tile buffer. Each such pre-load primitive is rasterised 23 to generate pre-load graphics fragments to be processed, and each such pre-load fragment will then be provided to the renderer 26. Each pre-load fragment will cause the renderer 26 to load the corresponding data from the external memory into the tile buffer 30.

For tiles that do not require data to be pre-loaded into the tile buffer 30, or for tiles for which pre-load processing has started, it is determined whether a colour buffer is available (step 69).

Where a colour buffer is not available, then the resource allocator 12 stalls processing for the tile until a colour buffer becomes available. When a colour buffer is available, then the resource allocator 12 allocates the colour buffer to the tile (step 70), and then initiates the remaining processing for the tile (step 71).

This will involve the resource allocator 12 issuing geometric primitives for the tile to the rasteriser 23 for rasterisation (and subsequent processing by the renderer, etc.). The data that is generated by the graphics processing pipeline 3 when processing the tile is stored in the allocated buffers in the tile buffer 30.

In the present embodiment, initially allocating a depth to the tile and then subsequently allocating a colour buffer to the tile results in a more efficient use of the limited space in the tile buffer 30 because the colour buffer can be used by one or more other tiles, e.g. while the graphics processing pipeline 3 waits for the data to be loaded into the depth buffer.

FIG. 7A illustrates a conventional fragment dependency tracking mechanism. As illustrated by FIG. 7A, the conventional graphics processing system must maintain a list of dependencies for each quad position within a tile. This is to ensure that fragments at the same position within a tile are correctly blended with and/or written over one another. This can use a significant amount of the GPU's 3 resources.

The present embodiment allows a greatly simplified dependency tracking mechanism to be implemented. This is because the GPU 3 only needs to know that the pre-load has been completed (and that a tile of (depth) data is ready and waiting in the tile buffer 30), and does not need to do the normal dependency tracking.

FIG. 7B illustrates a first fragment dependency tracking mechanism in accordance with an embodiment of the technology described herein. In this first embodiment, in order to determine when a tile has been fully preloaded, the GPU 3 can keep track of each preload quad that has been loaded into the tile buffer by marking each quad as complete, e.g. in one or more clear bits which are otherwise unused.

In this case, a bit map may be used (1 bit per quad), and a corresponding bit is flipped when each quad has been preloaded. This allows per-quad dependency decisions (i.e. further processing can continue or not by checking corresponding bit for each quad). Alternatively, this could be done for groups of quads, fraction (e.g. half) of tile, etc.

However, in this embodiment, the bit map may be relatively large, and so may have to be stored in an allocated portion of the tile buffer 30.

FIG. 7C illustrates another fragment dependency tracking mechanism in accordance with an embodiment of the technology described herein. In this embodiment, the GPU 3 can count the number of outstanding depth preload quads for a tile, and then not allow any non-depth-preload quads for a tile into the early testing 24 before all the depth preload quads have returned. To do this the GPU 3 can decrement (or increment) a counter whenever a pre-load quad completes. When the counter is equal to zero (or equal to the total number of fragments in a tile), the GPU 3 can determine that all of the data has been loaded into the tile buffer 30.

This is less flexible than the first embodiment, because the GPU 3 must wait for the entire tile to load, but it requires much less memory resources, and so the counter can be stored locally in a register (there is no need to use the tile buffer 30).

It will be appreciated that in the present embodiment, a tile to be pre-loaded can be pre-loaded well ahead of scheduling the other work for the tile. It should be noted that even when the GPU 3 has to wait because a pre-load operation is not yet complete, the wait time can be less than in the conventional case because the pre-load operation can be initiated earlier than conventionally.

In the present embodiment, the resource allocator 12 makes scheduling decisions by detecting pre-load candidates, checking whether resource (depth buffer) is available, and if so initiating the pre-load ahead of time. However, it would also be possible to configured the resource allocated 12 to be more sophisticated, and to e.g. predict the memory latency, e.g. to schedule the data to arrive "just in time".

Although the above embodiments have been described in terms of pre-loading multiple tiles of depth data into the tile buffer 30 (and although this is beneficial since, as described above, the Applicants have recognised that the depth buffer can be underutilised compared with the colour buffer, and that depth pre-loads can often be performed when a depth buffer is available but a colour buffer is not), it would also or instead be possible to pre-load multiple tiles of colour data into the tile buffer 30, if desired.

In this case, one or more tiles of a scene rendered in an initial rendering pass may be loaded back into a colour buffer for further processing, e.g. by adding fog effects, blurring or sharpening the image, adjusting the colour saturation or brightness, and so on. It would also or instead by possible to pre-load colour data into a colour buffer, and to then use that data to calculate other types of data such as depth data.

A related optimization is to allow post frame shaders, i.e. shaders that rely on data values calculated for all previous quads at a given position in a tile, to be scheduled after the regular processing for the tile has finished.

For example, when a scene has been rendered, it may be desired to perform post processing once the regular processing for the scene (or parts of the scene) has been completed. The fragments that will perform this processing will therefore have a dependency on all prior fragments at the same position in the tile to complete. If these post processing fragments are started too early, they will have to wait in the GPU until all the other fragments (which may be complex and time consuming) complete. This will waste some resources that are allocated to the post processing fragments.

To prevent this from happening, the GPU 3 may wait until a tile is completely finished before beginning processing for the post frame shader. This can be done with similar dependency tracking mechanisms as the preload shader described above, e.g. where the GPU 3 uses a bitmap or a counter to wait until a tile is completely finished before allowing the post frame shader into early-z testing 24. This has a similar advantage to the embodiments described above, in that the post frame shader does not have to wait due to the early-z test 24 blocking further progress, but is instead scheduled later when there is a higher likelihood that it can progress directly.

It will be appreciated that the technology described herein comprises an improved graphics processing system. This is done in embodiments at least, by configured to the graphics processing system to cause data for use when performing graphics processing operations for each tile of a set of plural tiles of a plurality of tiles to be loaded into the tile buffer before causing graphics processing operations to be performed for any of the tiles of the set of plural tiles.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A tile-based graphics processing system comprising:
a graphics processing pipeline comprising:
a plurality of processing stages, including at least a rasteriser that rasterises input primitives to generate graphics fragments to be processed, and a renderer that processes fragments generated by the rasteriser to generate rendered fragment data; and
a tile buffer configured to store data locally to the graphics processing pipeline;
wherein the graphics processing system comprises processing circuitry configured to:
determine, for each tile of a plurality of tiles for which graphics processing operations are to be performed by the graphics processing pipeline, whether data should be loaded into the tile buffer for use by the graphics processing pipeline when performing graphics processing operations for the tile;
for each tile of the plurality of tiles for which it is determined that data should be loaded into the tile buffer, cause the data to be loaded into the tile buffer; and
for each tile of the plurality of tiles for which graphics processing operations are to be performed, cause the graphics processing operations for the tile to be performed by the graphics processing pipeline by causing one or more primitives for the tile to be issued to the rasteriser;
and wherein the graphics processing system comprises processing circuitry operable to cause data for use when performing graphics processing operations for each tile of a set of plural tiles of the plurality of tiles to be loaded into the tile buffer before causing the graphics processing operations to be performed for any of the tiles of the set of plural tiles.

2. The tile-based graphics processing system of claim 1, wherein the data loaded into the tile buffer comprises data generated by the graphics processing pipeline in a previous rendering pass.

3. The tile-based graphics processing system of claim 1, wherein the graphics processing system comprises processing circuitry configured to load the data into the tile buffer from external memory.

4. The tile-based graphics processing system of claim 1, wherein the data loaded into the tile buffer comprises depth data.

5. The tile-based graphics processing system of claim 1, wherein the plurality of processing stages further comprises a depth test stage that performs depth testing for fragments generated by the rasteriser.

6. The tile-based graphics processing system of claim 1, wherein the graphics processing system comprises processing circuitry configured to:
determine, for each tile of the plurality of tiles for which graphics processing operations are to be performed, whether sufficient space is available in the tile buffer for storing data for use by the graphics processing pipeline when performing the graphics processing operations for the tile;
when it is determined that sufficient space is available in the tile buffer for storing the data for use by the graphics processing pipeline when performing graphics processing operations for the tile, allocate space in the tile buffer for use for storing the data for use by the graphics processing pipeline when performing graphics processing operations for the tile; and then
for each tile of the plurality of tiles for which it is determined that data should be loaded into the tile buffer, cause the data that is to be used by the graphics processing pipeline when performing graphics processing operations for the tile to be loaded into the allocated space;
wherein the graphics processing system comprises processing circuitry configured to subsequently:
determine, for each tile of the plurality of tiles for which graphics processing operations are to be performed by the graphics processing pipeline, whether sufficient space is available in the tile buffer for storing data that will be generated by the graphics processing pipeline when performing the graphics processing operations for the tile;
when it is determined that sufficient space is available in the tile buffer for storing data that will be generated by the graphics processing pipeline when performing graphics processing operations for the tile, allocate space in the tile buffer for use for storing the data that will be generated by the graphics processing pipeline when performing graphics processing operations for the tile; and then
for each tile of the plurality of tiles for which graphics processing operations are to be performed, store data that is generated by the graphics processing pipeline when performing graphics processing operations for the tile in the allocated space.

7. The tile-based graphics processing system of claim 1, wherein the graphics processing system comprises processing circuitry configured to:
determine, for each tile of the plurality of tiles for which graphics processing operations are to be performed, whether a depth buffer is available in the tile buffer for the tile;
when it is determined that a depth buffer is available for the tile, allocate a depth buffer for the tile; and then
for each tile of the plurality of tiles for which it is determined that data should be loaded into the tile buffer, cause the data that to be loaded into the allocated depth buffer;
wherein the graphics processing system comprises processing circuitry configured to subsequently:
determine, for each tile of the plurality of tiles for which graphics processing operations are to be performed, whether a colour buffer is available in the tile buffer for the tile;
when it is determined that a colour buffer is available for the tile, allocate a colour buffer for the tile; and then
for each tile of the plurality of tiles for which graphics processing operations are to be performed, store colour data that is generated by the graphics processing pipeline when performing graphics processing operations for the tile in the allocated colour buffer.

8. The tile-based graphics processing system of claim 1, wherein the graphics processing system comprises processing circuitry configured to:
for each tile for which it is determined that data should be loaded into the tile buffer, load the data into the tile buffer by loading data for each of plural fragments for the tile into the tile buffer; and for each fragment for the tile, update a corresponding piece of information when the data for the fragment has been loaded into the tile buffer;
and wherein the graphics processing system comprises processing circuitry configured to:
for each tile for which it is determined that data should be loaded into the tile buffer, determine whether the data has been loaded into the tile buffer using the information.

9. The tile-based graphics processing system of claim 1, wherein the graphics processing system comprises processing circuitry configured to:
for each tile for which it is determined that data should be loaded into the tile buffer, load the data into the tile buffer by loading data for each of plural fragments for the tile into the tile buffer; and
for each fragment for the tile, update a counter when the data for the fragment has been loaded into the tile buffer;
and wherein the graphics processing system comprises processing circuitry configured to:
for each tile for which it is determined that data should be loaded into the tile buffer, determine whether the data has been loaded into the tile buffer using the counter.

10. A tile-based graphics processing system, the graphics processing system comprising:
a graphics processing pipeline;
a tile buffer configured to store data locally to the graphics processing pipeline; and
processing circuitry configured to, for each tile of a plurality of tiles for which graphics processing operations are to be performed by the graphics processing pipeline:
allocate a depth buffer in the tile buffer to the tile for storing depth data for use by the graphics processing pipeline when performing graphics processing operations for the tile;
cause depth data for use by the graphics processing pipeline when performing graphics processing operations for the tile to be loaded into the allocated depth buffer; and then
allocate a colour buffer in the tile buffer to the tile for use by the graphics processing pipeline for storing colour data generated by the graphics processing pipeline when performing graphics processing operations for the tile;
wherein the graphics processing pipeline is configured to:
use the depth data stored in the allocated depth buffer when performing graphics processing operations for the tile and store colour data generated by the graphics processing operations in the allocated colour buffer.

11. A method of operating a tile-based graphics processing system that comprises:
a graphics processing pipeline comprising:
a plurality of processing stages, including at least a rasteriser that rasterises input primitives to generate graphics fragments to be processed, and a renderer that processes fragments generated by the rasteriser to generate rendered fragment data; and
a tile buffer configured to store data locally to the graphics processing pipeline;
the method comprising, the graphics processing system:
determining, for each tile of a plurality of tiles for which graphics processing operations are to be performed by the graphics processing pipeline, whether data should be loaded into the tile buffer for use by the graphics processing pipeline when performing graphics processing operations for the tile;
for each tile of the plurality of tiles for which it is determined that data should be loaded into the tile buffer, causing the data to be loaded into the tile buffer; and
for each tile of the plurality of tiles for which graphics processing operations are to be performed, causing the graphics processing operations for the tile to be performed by the graphics processing pipeline by causing one or more primitives for the tile to be issued to the rasteriser;
and wherein the method further comprises:
the graphics processing system causing data for use when performing graphics processing operations for each tile of a set of plural tiles of the plurality of tiles to be loaded into the tile buffer before causing the graphics processing operations to be performed for any of the tiles of the set of plural tiles.

12. The method of claim 11, further comprising the graphics processing system generating, in a previous rendering pass, the data that is to be loaded into the tile buffer.

13. The method of claim 11, further comprising loading the data into the tile buffer from external memory.

14. The method of claim 11, wherein the data loaded into the tile buffer comprises depth data.

15. The method of claim 11, wherein the graphics processing operations performed by the graphics processing pipeline for each tile comprise:
rasterising the one or more primitives for the tile to generate graphics fragments to be processed;
depth testing the fragments generated by the rasteriser; and
processing the fragments that pass the depth test to generate rendered fragment data.

16. The method of claim 11, further comprising the graphics processing system:
determining, for each tile of the plurality of tiles for which graphics processing operations are to be performed, whether sufficient space is available in the tile buffer for storing data for use by the graphics processing pipeline when performing the graphics processing operations for the tile;
when it is determined that sufficient space is available in the tile buffer for storing the data for use by the graphics processing pipeline when performing graphics processing operations for the tile, allocating space in the tile buffer for use for storing the data for use by the graphics processing pipeline when performing graphics processing operations for the tile; and then
for each tile of the plurality of tiles for which it is determined that data should be loaded into the tile buffer, causing the data that is to be used by the graphics processing pipeline when performing graphics processing operations for the tile to be loaded into the allocated space;
wherein the method comprises the graphics processing system subsequently:
determining, for each tile of the plurality of tiles for which graphics processing operations are to be performed by the graphics processing pipeline, whether sufficient space is available in the tile buffer for storing data that will be generated by the graphics processing pipeline when performing the graphics processing operations for the tile;
when it is determined that sufficient space is available in the tile buffer for storing data that will be generated by the graphics processing pipeline when performing graphics processing operations for the tile, allocating space in the tile buffer for use for storing the data that will be generated by the graphics processing pipeline when performing graphics processing operations for the tile; and then for each tile of the plurality of tiles for which graphics processing operations are to be performed, storing data that is generated by the graphics processing pipeline when performing graphics processing operations for the tile in the allocated space.

17. The method of claim 11, further comprising the graphics processing system:

determining, for each tile of the plurality of tiles for which graphics processing operations are to be performed, whether a depth buffer is available in the tile buffer for the tile;

when it is determined that a depth buffer is available for the tile, allocating a depth buffer for the tile; and then for each tile of the plurality of tiles for which it is determined that data should be loaded into the tile buffer, causing the data that to be loaded into the allocated depth buffer;

wherein the method comprises the graphics processing system subsequently:

determining, for each tile of the plurality of tiles for which graphics processing operations are to be performed, whether a colour buffer is available in the tile buffer for the tile;

when it is determined that a colour buffer is available for the tile, allocating a colour buffer for the tile; and then for each tile of the plurality of tiles for which graphics processing operations are to be performed, storing colour data that is generated by the graphics processing pipeline when performing graphics processing operations for the tile in the allocated colour buffer.

18. The method of claim 11, further comprising the graphics processing system:

for each tile for which it is determined that data should be loaded into the tile buffer, loading the data into the tile buffer by loading data for each of plural fragments for the tile into the tile buffer; and for each fragment for the tile, updating a corresponding piece of information when the data for the fragment has been loaded into the tile buffer;

and wherein the method further comprises:

for each tile for which it is determined that data should be loaded into the tile buffer, determining whether the data has been loaded into the tile buffer using the information.

19. The method of claim 11, further comprising the graphics processing system:

for each tile for which it is determined that data should be loaded into the tile buffer, loading the data into the tile buffer by loading data for each of plural fragments for the tile into the tile buffer; and for each fragment for the tile, updating a counter when the data for the fragment has been loaded into the tile buffer;

and wherein the method further comprises:

for each tile for which it is determined that data should be loaded into the tile buffer, determining whether the data has been loaded into the tile buffer using the counter.

20. A method of operating a graphics processing system that comprises a graphics processing pipeline and a tile buffer configured to store data locally to the graphics processing pipeline, the method comprising:

for each tile of a plurality of tiles for which graphics processing operations are to be performed by the graphics processing pipeline:

allocating a depth buffer in the tile buffer to the tile for storing depth data for use by the graphics processing pipeline when performing graphics processing operations for the tile;

causing depth data for use by the graphics processing pipeline when performing graphics processing operations for the tile to be loaded into the allocated depth buffer; and then allocating a colour buffer in the tile buffer to the tile for use by the graphics processing pipeline for storing colour data generated by the graphics processing pipeline when performing graphics processing operations for the tile;

the method further comprising:

the graphics processing pipeline using the depth data stored in the allocated depth buffer when performing graphics processing operations for the tile and storing colour data generated by the graphics processing operations in the allocated colour buffer.

21. A non-transitory computer readable storage medium storing computer software code which when executing on a processor performs a method of operating a tile-based graphics processing system that comprises:

a graphics processing pipeline comprising:

a plurality of processing stages, including at least a rasteriser that rasterises input primitives to generate graphics fragments to be processed, and a renderer that processes fragments generated by the rasteriser to generate rendered fragment data; and a tile buffer configured to store data locally to the graphics processing pipeline;

the method comprising, the graphics processing system:

determining, for each tile of a plurality of tiles for which graphics processing operations are to be performed by the graphics processing pipeline, whether data should be loaded into the tile buffer for use by the graphics processing pipeline when performing graphics processing operations for the tile;

for each tile of the plurality of tiles for which it is determined that data should be loaded into the tile buffer, causing the data to be loaded into the tile buffer; and for each tile of the plurality of tiles for which graphics processing operations are to be performed, causing the graphics processing operations for the tile to be performed by the graphics processing pipeline by causing one or more primitives for the tile to be issued to the rasteriser;

and wherein the method further comprises:

the graphics processing system causing data for use when performing graphics processing operations for each tile of a set of plural tiles of the plurality of tiles to be loaded into the tile buffer before causing the graphics processing operations to be performed for any of the tiles of the set of plural tiles.

* * * * *

UNITED STATES PATENT AND TRADEMARK OFFICE
CERTIFICATE OF CORRECTION

PATENT NO. : 10,580,113 B2
APPLICATION NO. : 16/153315
DATED : March 3, 2020
INVENTOR(S) : L. Flordal et al.

Page 1 of 1

It is certified that error appears in the above-identified patent and that said Letters Patent is hereby corrected as shown below:

In the Claims

Column 30, Line 46 (Claim 7, Line 12), please change "data that to be" to --data to be--.
Column 33, Line 22 (Claim 17, Line 11), please change "data that to be" to --data to be--.

Signed and Sealed this
Twenty-first Day of July, 2020

Andrei Iancu
*Director of the United States Patent and Trademark Office*